March 8, 1960   E. WILDHABER   2,927,444
UNIVERSAL JOINT

Filed Jan. 28, 1957   2 Sheets-Sheet 1

INVENTOR:
Ernest Wildhaber

March 8, 1960 E. WILDHABER 2,927,444
UNIVERSAL JOINT

Filed Jan. 28, 1957 2 Sheets-Sheet 2

INVENTOR:
Ernest Wildhaber

United States Patent Office 2,927,444
Patented Mar. 8, 1960

2,927,444

UNIVERSAL JOINT

Ernest Wildhaber, Brighton, N.Y.

Application January 28, 1957, Serial No. 636,686

11 Claims. (Cl. 64—8)

The present invention relates to universal joints for transmitting torque between two members whose axes intersect at an angle which may vary in operation. The universal joints specifically referred to are of the type wherein one of said members carries a plurality of rotatable parts, such as rollers, sliding blocks, and wherein the other member encloses said parts and contains internal ways for engagement by said parts. Particularly universal joints are referred to wherein one of said members carries a single pair of parts mounted to turn thereon on a common axis radial of the axis of said one member, and wherein the other member is an internal member containing a pair of parallel guideways for engagement by said parts, and where the internal member is wider in a direction across its ways than at right angles thereto. Such internal members are ordinarily provided with a circular flange at one end, and have an outside shape that changes from end to end.

One object of the present invention is to devise an internal member of simpler shape that permits accurate production at lower cost. A further object is to devise new shapes on the members or parts attached to said internal member, and improved forms of attachment. A still other aim is to devise a flange member rigidly secured to said internal member by a single pair of screws, that exerts more nearly uniform pressure on the entire circumference of an interposed gasket than hitherto attained with more screws.

A further object is to devise an internal member that has a plurality of recesses rather than a projecting flange for attachment to a coaxial member, and an internal member that can be cut off from drawn stock and requires very little machining.

Other objects will appear in the course of the specification and in the recital of the appended claims. These objects may be attained singly or in any combination.

In the drawings:

Fig. 7 also corresponds to Fig. 8, which can be considered a section along lines 8—8 of Fig. 7.

Figures 1, 5:
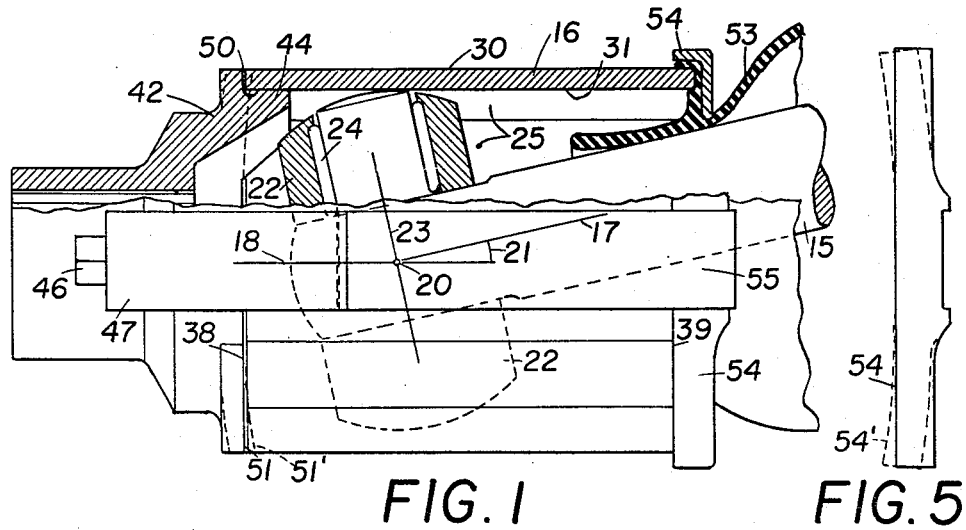
Fig. 1 is partly an axial section and partly a side view of a universal joint constructed according to the invention, and shown at its maximum operating angle.
Fig. 5 is a side view of the frame member also shown in Figures 1 and 2.
Figure 2:
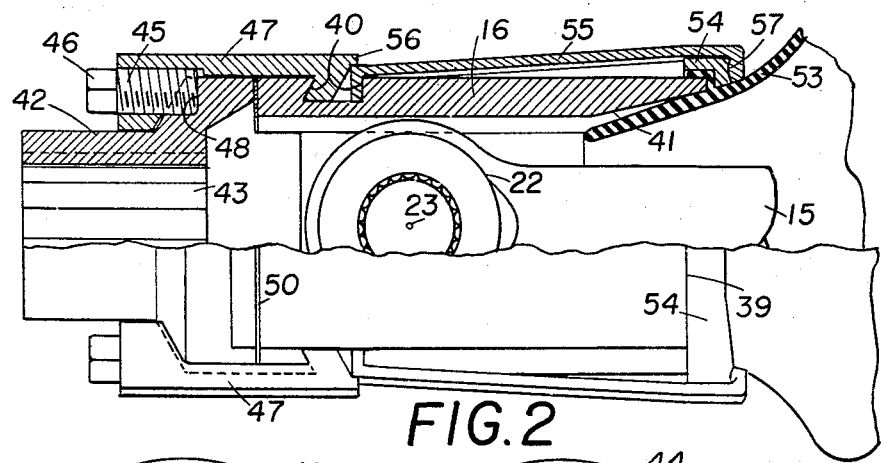
Fig. 2 is partly an axial section taken at right angles to the axial section of Fig. 1, and partly a side view corresponding thereto, shown at zero angularity of the universal joint.
Figures 3, 4:
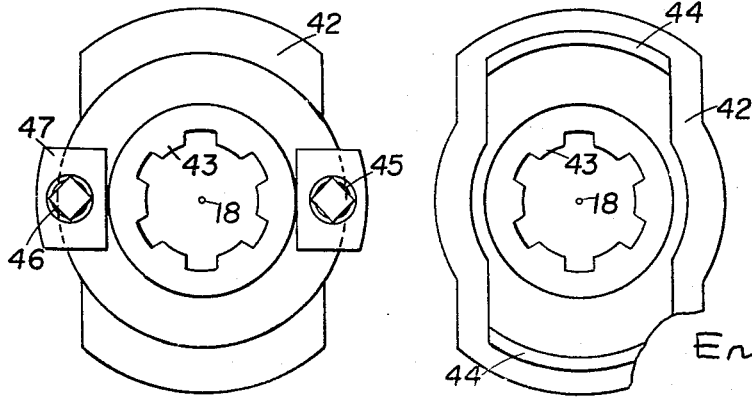
Fig. 3 is an end view of the universal joint illustrated in Figures 1 and 2, taken from the left of Fig. 1, and showing the flange member and the ties connecting it to the internal member of the universal joint.
Fig. 4 is an axial view of said flange member, taken in the opposite direction, looking from right to left in Fig. 1.

In Figures 1 to 7 numerals 15 and 16 denote two torque transmitting members whose axes 17 and 18 intersect at 20 and include an angle 21 with each other. Angle 21 may vary in operation. A pair of rollers 22 are rotatably mounted on member 15 to turn on a common axis 23 that extends radially of member 15 and of its axis 17. Needle bearings 24 may be used to this end.

Member 16 is an internal member enclosing the rollers 22. It contains straight ways 25 for engagement with said rollers 22. The ways 25 extend parallel to axis 18 of the internal member 16.

Figure 7:
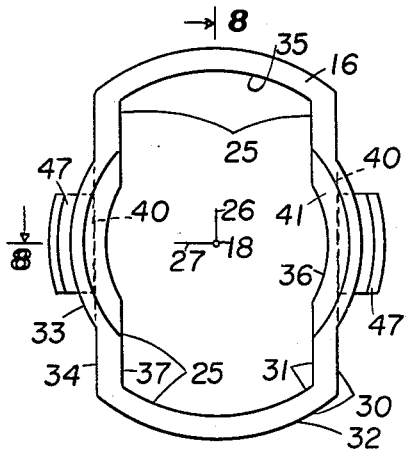
Fig. 7 is an end view of the internal member shown in Figures 1 and 2, looking left in Fig. 1, showing also the ties (47).

The invention resides particularly in the shape of internal member 16, in the parts connected therewith, and in the means of connection. Member 16 is essentially a tubular member of non-circular profile, as best seen in Fig. 7. It is wider in a direction across the ways 25, in vertical direction in Fig. 7, than in a direction at right angles thereto, in horizontal direction. It is symmetrical with respect to two axial planes 26, 27 that are perpendicular to each other. It lacks the customary flange at the end 38. Its outside surface 30 and its inside surface 31 are straight in the direction of its axis. In mathematical language, they are each composed of straight-line elements that extend parallel to its axis 18. Thus the outside surface 30 contains two diametrically opposite portions of a cylindrical surface 32, two opposite portions of a cylindrical surface 33, both coaxial with axis 18, and plane portions 34. Similarly the inside surface 31 contains diametrically opposite portions lying in cylindrical surfaces 35 and 36 respectively, and plane portions 37. The outside surface 30 is without any projection from end 38 to end 39 of the internal member 16, and is adapted to pass completely through a non-circular hole, in contact with the entire circumference of said hole on more than half the length of the member. This hole matches the contour of member 16, and may be the opening of a die preferably used in forming the member in a drawing operation.

Instead of projections, like for instance a flange, member 16 contains a plurality of recesses, here two diametrically opposite gashes 40, that extend peripherally on the internal member 16 in the region of its small diameter. The gashes 40 are straight and parallel, and extend perpendicular to the direction of axis 18. Only opposite the gashes 40 does the contact with said hole not occur on the entire circumference.

The inside surface 31 extends clear to the ends 38, 39 without obstruction, and is flared at 41, adjacent end 39. Internal member 16 is therefore essentially straight from end to end, with only some portions cut out. The merit of this design lies in the low-cost production.

The internal member 16 can be made from drawn stock, cold drawn to accurate size. A long tubular part or seamless tube of the required cross-section is made, and cut into pieces of the required length. It can be sawed into these pieces. Or the pieces can be cut off in a turning operation. But preferably this is done in a boring operation, in which a plurality of tools rotate about the axis 18 of the member 16 which is stationary during the cut. Radial feed is imparted to the tools to cut off the pieces. This operation may be combined with applying the flared end 41, also in a boring operation whereby the tools rotate. And, because the work piece is stationary, the operation can be further combined with a broaching operation, in which the two straight gashes 40 are applied. The combined operation finish-cuts the piece.

There is no need to cut the sides and bottoms of the internal ways 25, nor the cylindrical inside surface 36, so that a substantial saving is made.

A further advantage of the described simple shape lies in treatment after hardening. Because of the more nearly uniform cross-section from end to end, without flange, hardening distortions are smaller. Also the member can be straightened and pressed into shape after hardening more readily. In many instances it is unnecessary to grind the ways, polishing being sufficient. Polishing can be carried out in any suitable known way, including tumbling in a barrel.

The shape lends itself also to grinding and to honing.

The internal member 16 is rigidly secured to a coaxial torque-transmitting part. This part is here shown embodied as a flange member 42, that matches the contour of the internal member 16, see Fig. 4. It contains internal splines 43 for connection with a shaft (not shown). Its projections 44 (Figs. 1 and 4) reach into the ways 25 and contact the sides of said ways, to transmit torque thereto. It is pressed towards the internal member 16 by a pair of screws 45 with square ends 46. Each screw 45 threads into a tie 47 and applies pressure to the bottom 48 of a hole or recess provided on the flange member 42. This recess surrounds the screw at least partially, and secures it against being thrown off by centrifugal force. The ties 47 reach into and get a hold in the respective gashes 40 of dovetail shape, and are thereby further secured against being thrown off. Sealing means in the form of a gasket 50 are interposed between the flange member 42 and the end 38 of the internal member 16.

The single pair of screws 45 helps rapid connection and disconnection of the members 16 and 42, but adds to the difficulty of attaining sufficient pressure on the gasket 50 all around its periphery. Rather than providing an extra heavy flange member, I prefer to deform it a little, so that its plane contacting surface 51 is a plane only after the screw pressure is applied. In its natural unloaded state it stands out somewhat from said plane increasingly with increasing distance from the screws 45. The difference, of course, is very small. The unloaded shape is indicated with exaggeration by dotted lines 51' (Fig. 1). It is such that it becomes a plane when uniformly loaded all around its periphery or circumference. It is the counterpart of the deformed shape of a plane 51 that is uniformly loaded all around its circumference and held in the separated regions of the screws 45. The shape can be determined experimentally or by computation. In this way a more evenly distributed load may be attained on gasket 50 than can be obtained without this provision with more screws. The shape can be obtained under a press, or by machining if desired.

As the flange member 42 is elastically deformed, it exerts a continuous pressure on screws 45 at all time, and thereby secures them. If desired, they may be further secured in any suitable known way.

A flexible seal 53 is secured to the end 39 of member 16. The seal 53 is in the form of a flexible boot that is clamped to end 39 by a frame member 54 held in place by ties 55. The frame 54 is pressed towards end 39, with a portion of seal 53 in between, until the ties 55 can move into the gashes 40, and then keep said seal portion under load. This clamping of the seal is performed before the ties 47 are applied to connect members 16 and 42. The ties 47 have each a shoulder 56, that secures the adjacent ends of the ties 55. The opposite ends are secured by socket contacts 57 with the frame member 54.

The frame member 54 is also deformed in its unloaded state, as indicated with some exaggeration by dotted lines 54' in Fig. 5. Because of the lighter section the elastic deformation is here larger than on flange member 42. However, despite the light section, a substantially uniform pressure on the seal all about the circumference is attainable. The opposite end of seal or boot 53 is clamped in known manner to a portion rigid with member 15, and not shown.

Figure 8:
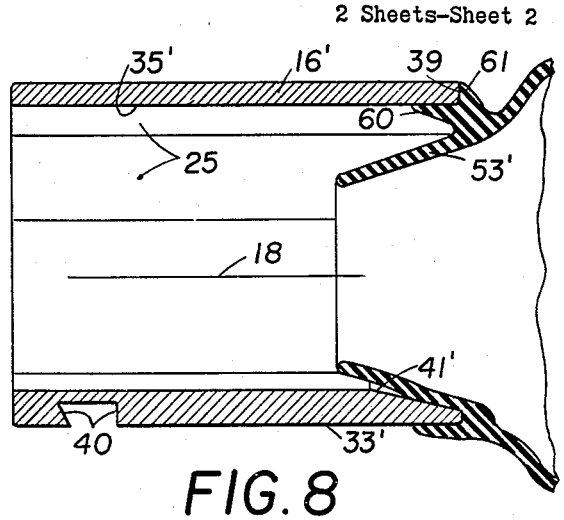
Fig. 8 is a compound axial section of an internal member and boot illustrating a modification.

The embodiment shown in Fig. 8 differs from the embodiment of Figures 1 to 7 merely in the attachment of the flexible seal or boot 53'. Instead of being clamped to internal member 16' the boot 53' is bonded thereto, to strongly adhere thereto. Any suitable known way of adhesion may be used. The seal is moulded to match the non-circular end of internal member 16'. It has a non-circular end 61 that is wider across the guideways 25 than at right angles thereto. It is bonded to the end 39, and also reaches into the guideways 25 at 60, adhering to the end of the inside surface 35'. It is further bonded to part of its flared end 41', and may reach to part of the outside surface 33'. This bond forms a permanent connection.

The internal member 16' itself, the flange member 42, and their connection with ties 47 and screws 45 remains the same as already described.

While I have shown cylindrical rollers 22, it should be understood that other parts may be used in their place, and mounted to turn on an axis radial of the axis 17 of the member that carries these parts. Thus sliding blocks may be used in place of the rollers shown. Also spherical or ball-type rollers may be used. In this case the guideways contain cylindrical side surfaces, as well known.

Here also the internal member, like member 16 or 16', may have a larger diameter across the guideways than at right angles thereto.

Figures 9, 10:
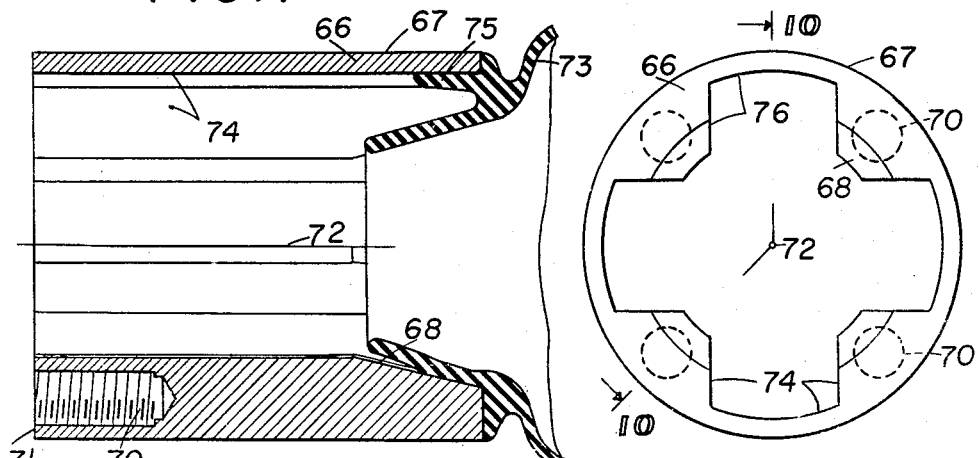
Fig. 9 is an end view of another form of internal member, looking at the flared end.
Fig. 10 is a compound axial section taken along lines 10—10 of Fig. 9, looking in the direction of the arrows.
Figure 6:
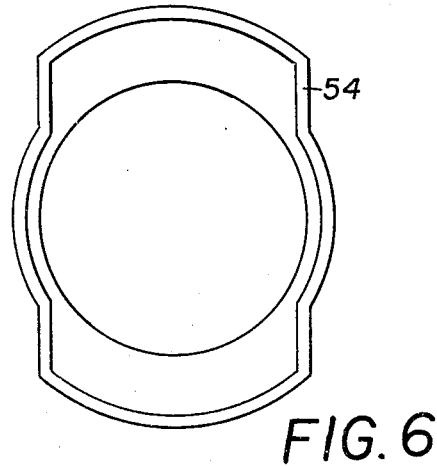
Fig. 6 is an end view of this frame member, looking from left to right in Fig. 1.

In the further embodiment of the invention illustrated in Figures 9 and 10, the internal member 66 contains a completely cylindrical outside surface 67, without gash or recess. It is flared at 68. The recesses serving as a hold for securing member 66 to another member, such as a flange member similar to member 42, are here threaded holes 70 applied to the end face 71 and spaced about the axis 72 of member 66. A flexible boot 73 is bonded to the opposite end. The boot reaches into the ways 74 at 75 and has a non-circular end to conform to the shape of the internal member and to match the varying contour of the inside surface 76. This keeps machining at a minimum.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein set forth and as fall within the scope of the invention or the limits of the appended claims.

I claim:

1. A universal joint for transmitting torque comprising two members whose axes intersect at an angle which may vary in operation, a pair of parts mounted on one of said members to turn about a common axis radial of the axis of said one member, the other of said two members being an internal member enclosing said parts and containing a pair of guideways that extend parallel to its axis, for engagement with said parts, the width of said internal member being larger across said guideways than at right angles thereto, said internal member having an outside surface and an inside surface each composed of straight-line elements extending parallel to its axis, said outside surface being without projection from end to end of the member and being adapted to pass completely through a non-circular hole while in contact with the entire circumference of said hole on more than half the length of said member, said inside surface being clear and without obstruction from end to end of the member and being flared adjacent one end, a part coaxial with said internal member, said internal member having a plurality of notches extending peripherally on its outside surface in the region of relatively small width, and ties extending axially on the outside of said internal member and engaging said notches, to draw said internal member towards said coaxial part and to connect said internal member to said coaxial part.

2. A universal joint according to claim 1, wherein said notches are straight and perpendicular to the direction of the axis of the internal member.

3. A universal joint according to claim 1, wherein each of said ties has the shape of a slanted and wide letter U in longitudinal section, one end of each tie engaging a notch, and its other end containing a threaded bolt for exerting pressure on said coaxial member.

4. A universal joint according to claim 3, wherein each of said threaded bolts extends into a recess provided on said coaxial part, to secure said bolt.

5. A universal joint for transmitting torque comprising two members whose axes intersect at an angle which may vary in operation, a pair of parts mounted on one of said members to turn about a common axis radial of the axis of said one member, the other of said two members being an internal member enclosing said parts and containing a pair of guideways that extend parallel to its axis, for engagement with said parts, the width of said internal member being larger across said guideways than at right angles thereto, said internal member having an outside surface and an inside surface each composed of straight-line elements extending parallel to its axis, said outside surface being without projection from end to end of said internal member and being adapted to pass completely through a non-circular hole in contact with the entire circumference of said hole on more than half the length of said internal member, said internal member having a plurality of recesses in its outside surface, means engaging in said recesses for exerting axial pressure on said internal member, said inside surface being clear and without obstruction from end to end of the member and being flared adjacent one end, sealing means following the circumference at one end of said internal member, and a part also following said circumference for exerting pressure on said sealing means, means for exerting pressure on said last-named part in two separated regions only to press it against said sealing means and the last-named end, the shape of said last-named part in its natural unloaded state differing from the shape of the last-named end and standing out increasingly from its final shape under pressure with increasing distance from said regions, to effect more nearly uniform pressure on said sealing means along the entire circumference.

6. A universal joint according to claim 5, wherein said last-named part is a flange member adapted to transmit the full torque of the joint, and wherein said sealing means is a non-circular gasket following the contour of said internal member.

7. A universal joint according to claim 5, wherein said last-named part is a frame member having a side surface that is a plane after pressure is exerted in two separated regions, and that differs from a plane in its natural unloaded state, and wherein said sealing means is a flexible boot clamped to said internal member by said frame member.

8. A universal joint for transmitting torque comprising two members whose axes intersect at an angle which may vary in operation, a plurality of parts rotatably mounted on one of said members, said parts engaging straight guideways provided in the other of said two members, said other member being an internal member enclosing said parts, said internal member having an outside surface and an inside surface each composed of straight-line element extending parallel to its axis, said outside surface being without projection from end to end of the member and being adapted to pass completely through a hole while in contact with the entire circumference of said hole on more than half its length, said inside surface extending clear to the ends of the member without obstruction and being flared at one end, a part coaxial with said internal member, and means for removably connecting said internal member to the last-named part, said means engaging a plurality of recesses provided in said internal member and spaced around its outside circumference, and a flexible boot bonded to the flared end of said internal member to adhere thereto, said boot having a non-circular end to conform to the shape of said internal member.

9. A universal joint according to claim 8, wherein said flexible boot reaches into the guideways provided on said internal member and is bonded to said guideways as well as to the plane end of said internal member.

10. A universal joint for transmitting torque comprising two members whose axes intersect at an angle which may vary in operation, a pair of parts mounted on one of said members to turn about a common axis radial of the axis of said one member, the other of said two members being an internal member enclosing said parts and containing a pair of guideways that extend parallel to its axis, for engagement with said parts, the width of said internal member being larger across said guideways than at right angles thereto, said internal member having an outside surface and an inside surface each composed of straight-line elements extending parallel to its axis, said outside surface being without projection from end to end of the member and being adapted to pass completely through a non-circular hole while in contact with the entire circumference of said hole on more than half the length of said member, said inside surface being clear and without obstruction from end to end of the member and being flared adjacent one end, a part coaxial with said internal member, and a flexible boot bonded to the flared end of the named internal member to adhere to said end, said boot having an oblong end wider across the ways provided on said internal member than at right angles thereto.

11. A universal joint according to claim 10, wherein said flexible boot reaches into the guideways provided on said internal member, and is bonded to said guideways as well as to the end of said internal member, and wherein the recesses in said internal member are diametrically opposite straight gashes of equal axial position that lie in the region of smallest width of said internal member.

References Cited in the file of this patent

UNITED STATES PATENTS

| | | |
|---|---|---|
| 2,186,846 | Trbojevich | Jan. 9, 1940 |
| 2,284,199 | Greiner | May 26, 1942 |
| 2,670,614 | Wildhaber | Mar. 2, 1954 |
| 2,685,784 | Wildhaber | Aug. 10, 1954 |
| 2,722,115 | Dunn | Nov. 1, 1955 |
| 2,752,765 | Wildhaber | July 3, 1956 |
| 2,755,640 | Dunn et al. | July 24, 1956 |